(No Model.) 2 Sheets—Sheet 1.
M. G. BUNNELL.
MACHINE FOR MAKING AND REPAIRING ROADS.
No. 455,703. Patented July 7, 1891.
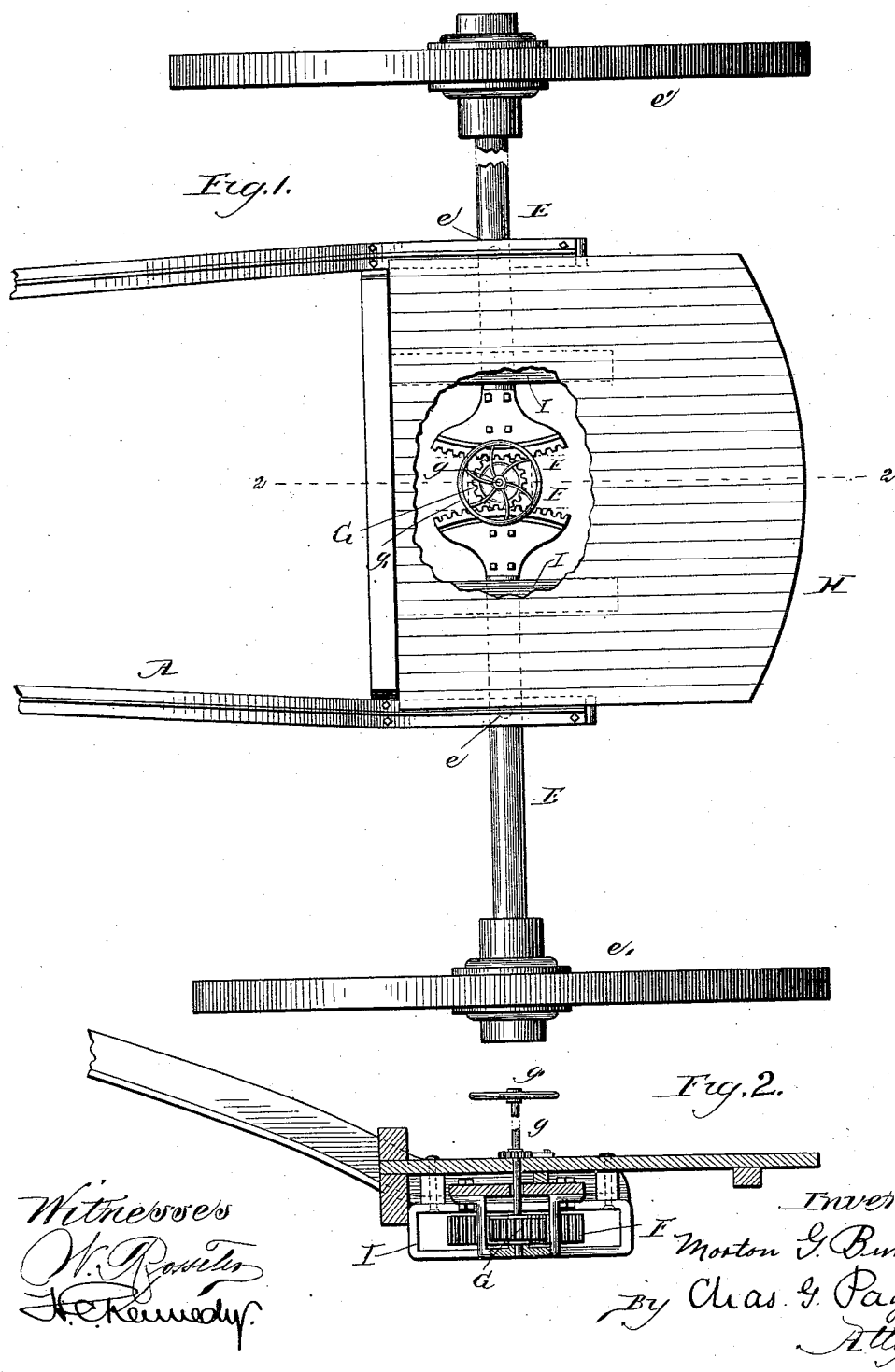

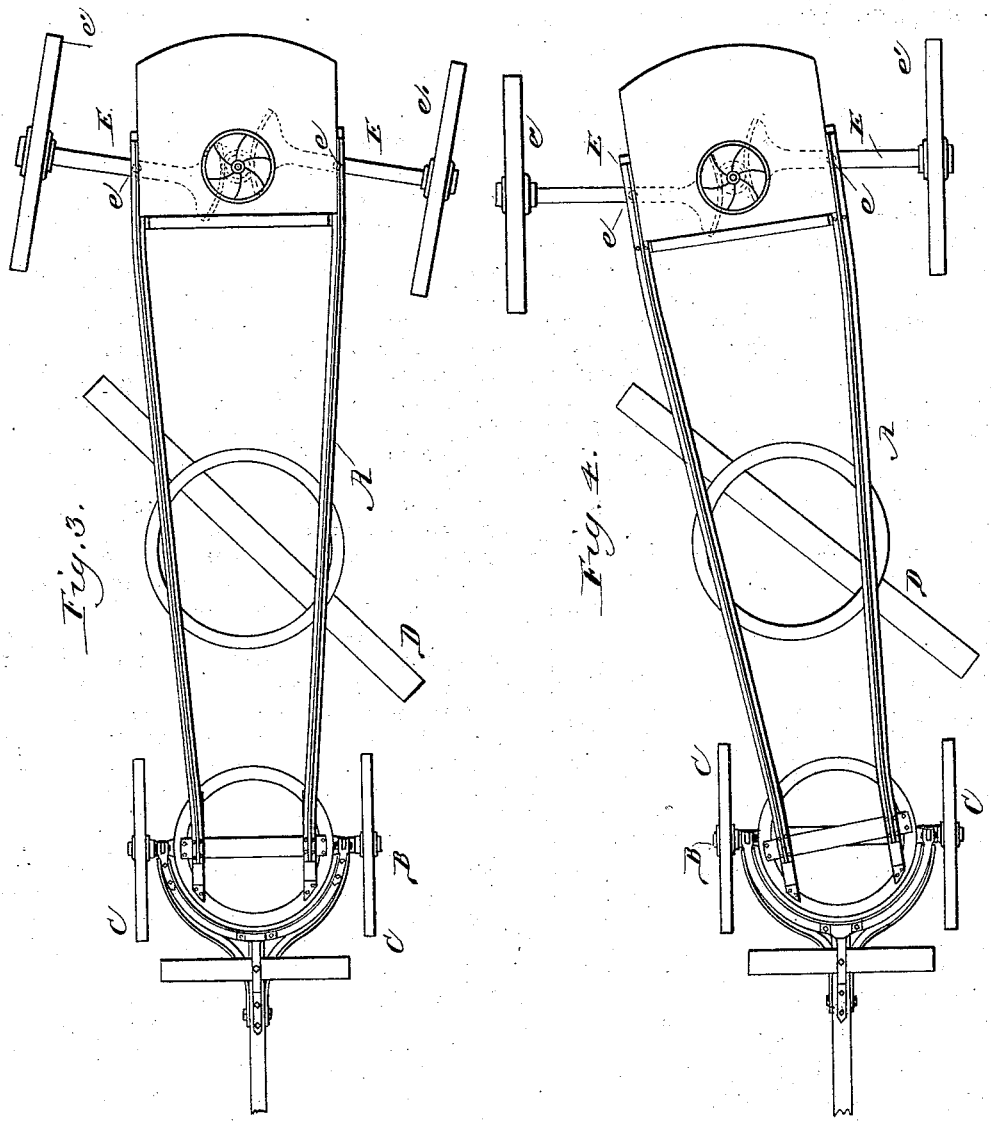

UNITED STATES PATENT OFFICE.

MORTON G. BUNNELL, OF CHICAGO, ILLINOIS, ASSIGNOR, BY MESNE ASSIGNMENTS, TO ANNA B. AUSTIN, OF SAME PLACE.

MACHINE FOR MAKING AND REPAIRING ROADS.

SPECIFICATION forming part of Letters Patent No. 455,703, dated July 7, 1891.

Application September 8, 1890. Serial No. 364,295. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to road-working machines involving a four-wheeled body-frame and a scraper-blade carried by the body-frame through the medium of suitable raising and lowering devices and adapted for diagonal work—that is to say, adapted to be placed in a position oblique to the line of progression, so as to plow up the soil with its forward end and scrape or move the soil along its length for the purpose of forming a road-bed.

The objects of my invention are to provide means for counteracting side draft; to adjust the body-frame so as to attain a bodily adjustment to one side or the other of the scraper-blade; to permit a rear wheel at either side of the machine to be brought into alignment with and run in the track of one of the forward wheels on a short front axle; to attain the foregoing results, and at the same time employ a short front axle for quick turning and a long rear axle for insuring steadiness of the machine; to permit the forward end of the blade to be projected beyond a line between the front and rear wheels at one side of the machine, so as to cut into a bank, and to permit the blade to be projected beyond the track of either front wheel.

To the attainment of the foregoing and other useful ends my invention consists in matters hereinafter set forth, and particularly pointed out in the claims.

In carrying out my invention I divide the rear axle into a couple of sections, which are so pivotally connected with the body-frame that they may swing horizontally about their respective pivots. Each axle-section is provided at its outer end with a supporting-wheel, and may be brought and held in alignment with the other section when so desired. The rear axle is therefore composed of two separately-pivoted axle-sections, each capable of horizontal adjustment about its pivot, so as to set it, when necessary, oblique to the line of draft or general progression of the machine. By simultaneously adjusting these axle-sections so as to set them oblique to the length of the body-frame and in lines parallel to one another the rear wheels will run to one side until the body-frame is oblique to the line of general progression and the axle-sections are parallel with the forward axle. The rear wheels will then run straight ahead and will resist any tendency of the body-frame to swing back to its first position. By properly adjusting the rear axle-sections a rear wheel can be caused to run in the track of the wheel, running ahead of it and carried by a short front axle.

For the broader purpose of my invention I may employ various means for adjusting the rear axle-sections; but as a preferred way I provide the inner end of each rear axle-section with a cog or gear segment, which serves as a curved rack, and engage the rack-teeth thus arranged on the axle-sections by a pinion on a hand-wheel shaft.

In the accompanying drawings, Figure 1 is a top plan view of the rear portion of a road-working machine embodying my invention with a portion of the rear platform broken away for convenience of illustration. Fig. 2 is a section on line 2 2 in Fig. 1. Fig. 3 is in the nature of a diagram illustrating a top plan view of the machine with the axle-sections adjusted into position oblique to the body-frame. Fig. 4 is a like view with the axle-sections parallel with the front axle and the body-frame swung round from its position in Fig. 3, it being understood that in Figs. 3 and 4 various parts of the machine are omitted.

In said drawings, A indicates the body-frame, which is pivotally supported at its forward end upon a short front axle B, provided with wheels C.

The diagonally-adjustable scraper-blade D can be drawn from the front end of the machine or pushed from the rear, as may be desired, and is understood to be suspended below the body-frame by any suitable raising and lowering device. The blade extends across the space between the front and rear wheels and is also preferably reversible—that is to say, it is preferably so pivoted between its ends that either end may be placed ahead, although I may apply my invention to a machine in which but one end of the blade can be set ahead.

The rear axle is divided into a couple of sections E E, which are separately pivoted between their ends to the body-frame, as at e e, in any suitable way. These axle-sections are pivoted to swing horizontally in contradistinction to machines wherein two sections of an axle are pivoted so as to tilt or swing vertically for the purpose of tipping the wheels, it being herein understood that I attain radically different results, and that in accordance with my invention the wheels are not tipped but adjusted, respectively, ahead and rearwardly, and hence that, in addition to the important results hereinbefore set forth, they run at all times squarely upon the ground, and thereby at all times derive the full benefit of the broad bearing-surfaces of their tires and the easy running incident thereto.

The axle-sections are provided with the rear wheels e' at their outer ends, and are each desirably extended beyond the body-frame, so that they shall together constitute in effect an extended rear axle which is longer than the short front axle. In referring therefore to the two axles I shall hereinafter speak of them as the "short front axle" and the "long" or "extended divided rear" axle.

The two rear axle-sections are horizontally adjustable about their respective pivots, as in Fig. 3, so that they may be both placed oblique to the length of the body-frame. When the rear axle-sections are thus set and held obliquely to the length of the body-frame, the rear wheels will have a tendency to run to one side, and during the advancement of the machine they will so run until the body-frame assumes a position oblique to the general line of draft or progression and the rear axle-sections are again parallel with the front axle, and hence in position to permit the rear wheels to run straight ahead. A disposition of the rear portion of the body-frame to swing to one side by reason of side draft caused by resistance to the oblique scraper-blade will be opposed by the rear wheels, which run straight ahead. The sections of the long rear axle can also be adjusted horizontally, so that one rear wheel can run straight ahead in the track of the wheel directly in advance of it, as in Fig. 4, wherein one of the wheels of the long divided rear axle is in alignment with one of the wheels of the short front axle.

While I may provide various means—such as levers, gearing, and the like—for adjusting and holding the rear axle-sections, I have herein shown each section provided at its inner end with a gear-segment or curved rack F. These racks are engaged by a pinion G on a vertically-arranged hand-wheel shaft g, which is carried by the body-frame, and provided with a hand-wheel g' within convenient reach of an attendant standing upon the rear platform H of the machine. By operating said pinion the inner ends of the rear axle-sections will be simultaneously swung horizontally and respectively in opposite directions, while at the same time, however, they will at all times be in parallel lines, and hence the rear wheels will at all times be in parallel planes.

The axle-sections may have their inner end portions arranged below the rear platform H, and the platform or other fixture on the body-frame can be provided with any suitable cross piece or bearing for the hand-wheel shaft. I also prefer providing the body-frame with guides I, through which the inner end portions of the rear axle-sections extend, so as to guide and steady the same. By thus dividing the rear axle and pivoting its sections I can set the sections oblique to the body-frame with a comparatively short forward and rearward swing, respectively, on the part of the rear wheels. Thus in bringing the rear axle-sections into the position shown in Fig. 3, the forward movement of the other rear wheel will be comparatively slight, owing to the fact that each section is pivoted between its ends, so as to provide it in effect with two comparatively short arms, which, however, in the aggregate form a long rear axle. This feature permits quick, ready, and easy adjustment of the rear axle-sections, and is also serviceable when the machine is under way and an adjustment of the long-divided rear axle is to be made.

The body-frame can be pivoted upon the front axle by any suitable means, so that it may swing horizontally about its pivotal connection.

For the broader purposes of my invention I may make the front axle as long as the rear axle; but by so doing I cannot of course avail myself of the important feature of adjusting the long rear axle so as to bring one of its wheels into alignment with one of the wheels of a short front axle, and hence I prefer to provide a short front axle and a long divided rear axle.

What I claim as my invention is—

1. The combination, substantially as hereinbefore set forth, in a machine for making and repairing roads, of a body-frame pivoted at its forward end upon a wheeled front axle, a diagonally-adjustable scraper-blade carried with the body-frame and extending across the space between the front and rear wheels, and a divided rear axle comprising a couple of adjustable horizontally-swinging wheeled axle-sections pivotally connected with the body-frame, for the purpose described.

2. The combination, substantially as hereinbefore set forth, in a machine for making and repairing roads, of the body-frame pivotally supported upon a short wheeled front axle, a diagonally-adjustable scraper-blade carried with the body-frame and extending across the space between the front and rear wheels, and a divided long rear axle comprising a couple of adjustable horizontally-swinging wheeled axle-sections pivotally connected with the body-frame, for the purpose described.

3. The combination, substantially as hereinbefore set forth, in a machine for making and repairing roads, of a body-frame pivotally supported upon a front wheeled axle, a diagonally-adjustable scraper-blade extending across the space between the front and rear wheels, the rear divided axle comprising a couple of adjustable horizontally-swinging wheeled sections pivotally connected with the body-frame, and means suitable for adjusting and holding in adjustment said rear axle-sections.

4. The combination, substantially as hereinbefore set forth, in a machine for making and repairing roads, of a body-frame pivotally supported at its forward end upon a front wheeled axle, a diagonally-adjustable scraper-blade extending across the space between the front and rear wheels, a divided rear axle comprising a couple of adjustable horizontally-swinging wheeled sections pivotally connected with the body-frame, gears or racks on the inner ends of said axle-sections, and a pinion engaging said gears or racks, for the purpose described.

5. The combination, substantially as hereinbefore set forth, with the body-frame and a diagonally-adjustable scraper-blade extending across the space between the front and rear wheels, of the adjustable horizontally-swinging axle-sections E, provided with wheels $e'$ and pivoted between their ends to the body-frame, and horizontal guides for the inner end portions of said axle-sections.

MORTON G. BUNNELL.

Witnesses:
HARRY C. KENNEDY,
CHAS. G. PAGE.